United States Patent [19]
Desoutter et al.

[11] Patent Number: 6,153,145
[45] Date of Patent: *Nov. 28, 2000

[54] METHOD FOR MAKING CONTAINERS SUCH AS BOTTLES HAVING A SELF-STABILIZING BASE

[75] Inventors: Luc Desoutter; Guy Feuilloley, both of Le Havre; Jean-Tristan Outreman, Octeville sur Mer; Paul La Barre, Sainte-Adresse, all of France

[73] Assignee: Sidel, Le Havre Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,492

[22] PCT Filed: Feb. 6, 1996

[86] PCT No.: PCT/FR96/00194

§ 371 Date: Oct. 9, 1997

§ 102(e) Date: Oct. 9, 1997

[87] PCT Pub. No.: WO96/24525

PCT Pub. Date: Aug. 15, 1996

[30] Foreign Application Priority Data

Feb. 9, 1995 [FR] France .................................. 95 01507

[51] Int. Cl.[7] ............................. B29C 49/08; B29C 49/18
[52] U.S. Cl. ......................... 264/521; 264/529; 264/530; 264/532
[58] Field of Search .................................. 264/521, 529, 264/530, 532

[56] References Cited

U.S. PATENT DOCUMENTS

| 3,275,726 | 9/1966 | Rudolph | 264/529 |
|---|---|---|---|
| 3,757,718 | 9/1973 | Johnson | 264/531 |
| 4,892,205 | 1/1990 | Powers et al. | |
| 5,047,271 | 9/1991 | Feddersen et al. | |
| 5,281,387 | 1/1994 | Collette et al. | 264/521 |
| 5,352,402 | 10/1994 | Orimoto et al. | 264/530 |
| 5,389,332 | 2/1995 | Amari et al. | 264/530 |

FOREIGN PATENT DOCUMENTS

| 0425360 | 5/1991 | European Pat. Off. |
| 0559103 | 9/1993 | European Pat. Off. |
| 2429157 | 1/1980 | France |
| 2508004 | 12/1982 | France |
| 2595294 | 9/1987 | France |
| 9006263 | 6/1990 | WIPO |

*Primary Examiner*—Jan H. Silbaugh
*Assistant Examiner*—Dae Young Lee
*Attorney, Agent, or Firm*—Sughrue, Mion, Zinn Macpeak & Seas, PLLC

[57] ABSTRACT

A container such as a bottle or the like consisting of a biaxially oriented thermoplastic material and capable of withstanding a relatively harsh use environment without noticeably losing its shape. Said container has an inwardly curved base (2) with an inwardly projecting convex portion as in a champagne bottle bottom, and a substantially greater thickness than the side wall (3) of the container. Said base (2) includes an outwardly-facing non-convex central portion (4).

19 Claims, 3 Drawing Sheets

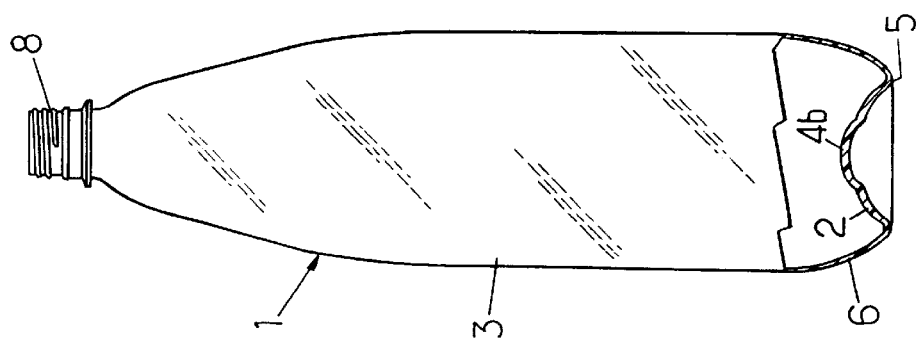
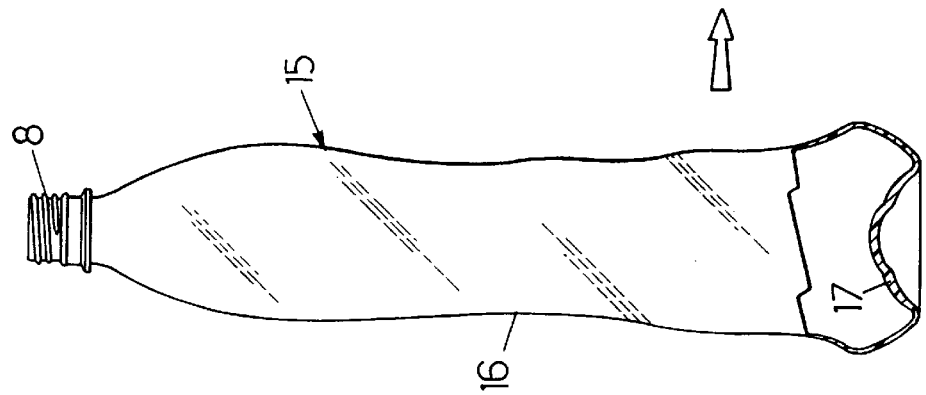
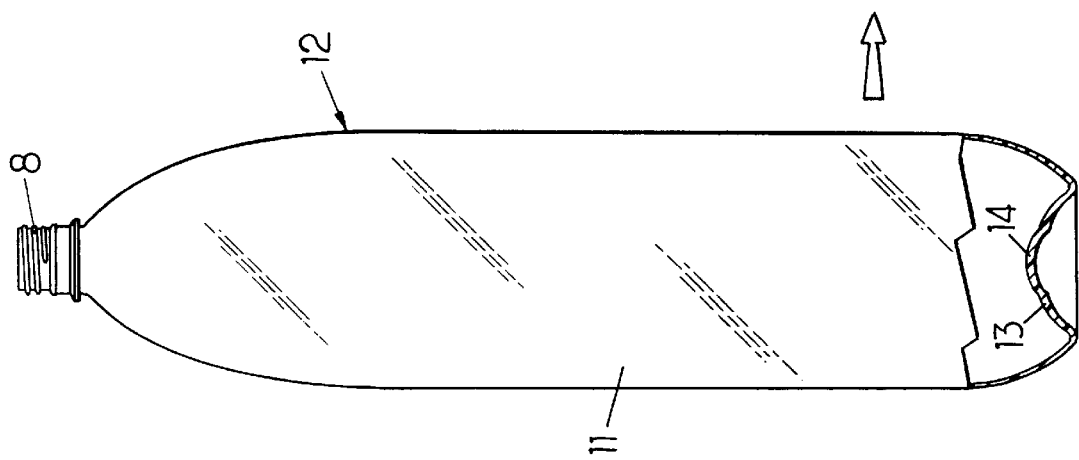
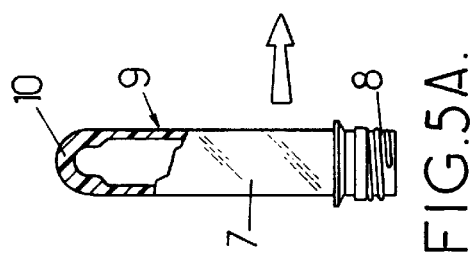
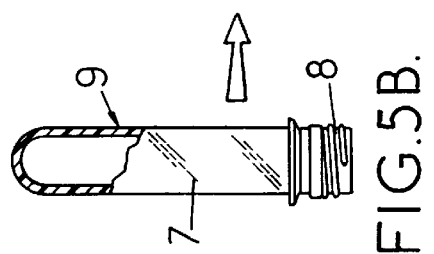

METHOD FOR MAKING CONTAINERS SUCH AS BOTTLES HAVING A SELF-STABILIZING BASE

The present invention relates to improvements made to containers, such as a bottle, flask or the like, which are made of a biaxially oriented thermoplastic and are capable of withstanding, without appreciable deformation, relatively harsh conditions of use, the containers having an inwardly convex curved bottom ("champagne bottom") which has a thickness substantially greater than that of the side wall of the containers, and it relates more particularly to improvements made to the processes for manufacturing such containers.

BACKGROUND OF THE INVENTION

The containers to which the invention more particularly relates are those intended to experience and withstand without appreciable deformation, in use, relatively harsh conditions such as, for example, the filling with a hot liquid and/or the pasteurization of the liquid contained in the container, the filling with a pressurized liquid (for example, carbonated drinks), the cleaning with liquids and/or cleaning agents in the case of reusable containers.

A container of the aforementioned kind is described in Document FR-A-2, 595, 294.

In the first place, it was known how to manufacture containers of this kind which had an outwardly rounded bottom, either hemispherical or of complex shape. However, this shape of the bottom led to the drawback of requiring the addition of a cup enabling the container to rest stably on a support. This additional operation was problematic since it required extra steps, for putting adhesive into place and for centering the cup with respect to the bottom of the container. Furthermore, since there were now two elements made of different materials, this resulted in difficulties with regard to recycling the materials of which the discarded containers were composed. Another drawback of these containers provided with an added cup was that of not withstanding the cleaning operations carried out on reusable containers: the bond between the base and the bottom of the container (by means of an adhesive) deteriorated on contact with cleaning products (for example, sodium hydroxide) and, furthermore, since this bond was not permeable, cleaning or rinsing liquid got into the base and could not be easily removed.

In order to help to overcome these drawbacks, it was attempted to produce bottoms which were rounded the opposite way to the previous ones, with inwardly facing convexity (so-called "champagne bottoms"). However, production of champagne bottoms with a central area having an opposite (outwardly facing) convexity by way of mechanical reinforcement and with a thickness substantially greater (by at least four. times) than that of the side wall of the body, depending on the stresses which the container has to withstand during its use, did not prevent a loss of stability of this bottom, which cracks under the action of the chemical agents used during the cleaning operations and which loses its shape (sinks back in), in particular due to the effect of temperature.

SUMMARY OF THE INVENTION

The object of the invention is essentially to remedy the aforementioned drawbacks and to propose a novel process for the manufacture of containers having a self-stabilizing bottom, which leads to a container of stable shape whatever the treatments which it encounters during its use, the invention furthermore being particularly and advantageously, although not exclusively, applicable to reusable containers which can be washed at high temperature.

To these ends, a process for manufacturing a container, such as the one mentioned in the preamble, is proposed, which process essentially comprises the following steps:

a) at least the amorphous body of a preform is heated to a temperature at least equal to the softening temperature of the thermoplastic;

b) the hot body of the preform is molded in order to form the body of an intermediate container, the height of which is from 15% to 30% greater than the height of the final container and the transverse dimension of the body of which is approximately 0 to 30% greater than the transverse dimension of the body of the final container to be obtained, while the corresponding shaping walls of the mold are maintained at a temperature of between approximately 10 and 180° C., preferably approximately 60° C., and the bottom of which is inwardly rounded and has a central area devoid of outwardly facing convexity, said bottom having substantially the shape of the bottom of the final container to be obtained and having a diameter equal to or slightly greater than that of the bottom of the final container to be obtained, while the corresponding shaping walls of the mold are cooled to a temperature which is substantially less than the walls for shaping the intermediate part and is between approximately 2 and 20° C., preferably approximately 10° C., the degree of elongation of the thermoplastic intended to form the entire bottom being less than or at most equal to 1.8 and corresponding to development of the material with no appreciable drawing thereof or with limited drawing;

c) next, at least the body of the intermediate container is heated, the side wall of the body being heated to a temperature of between approximately 160 and 230° C. and the bottom being heated to a temperature of approximately 60 to 120° C., after which a preform having a necked body is obtained, the bottom of which has approximately the shape and size of the bottom of the final container to be obtained;

d) and then, finally, the body of the necked preform is molded once again by blowing the side wall of the body, but with no appreciable drawing of the bottom.

The presence of the central area devoid of outwardly facing convexity constitutes a kind of keystone at the center of the champagne bottom and imparts particularly improved stability to it, preventing it from losing its initial characteristics.

In one practical embodiment, starting from a currently known preform in which the bottom contains the point of injection said central area includes the point of injection, which is slightly rounded outward so that the notion of there being no outwardly facing convexity then applies to the entire central area with the exception of the point of injection.

In one practical embodiment, the shape and size of the bottom of the final blowing mold are substantially equivalent to the shape and size of the bottom of the necked preform.

In a variant, pressure compensation is provided in the mold under the bottom of the preform in order to compensate for the blowing pressure, so as to obtain the final container.

In one possible embodiment, the central area has the approximate shape of a plateau shifted axially inward, or else it is rounded in the form of an inwardly convex dome.

Advantageously, said central area projects from the surrounding region of the bottom by at least 1 mm toward the inside of the container and, also advantageously, it has a thickness substantially equal to that of the rest of the bottom.

In a practical embodiment, the central area is approximately round; provision may be made for the transverse dimension of the central area to represent approximately 0 to 40% of the transverse dimension of the bottom; and, the increased thickness of the bottom is desirably equal to approximately three to eight times the thickness of the thin side wall.

In another possible embodiment, the entire bottom exhibits a continuous curvature and forms a continuous vault, without an angular line and without opposite curvature (with the exception of the optional point of injection mentioned above).

A central area designed in this way retains the central part of the champagne bottom and prevents it from collapsing due to the effect of temperature and/or pressure.

For optimum stiffening of the lower part of the champagne bottom and the annular ring by which the container is made to rest on a support, provision may furthermore be advantageously made for the lower part of the side wall adjacent to the bottom also to have a thickness greater than that of the rest of the side wall, the height of said thicker lower part not exceeding approximately the height of the champagne bottom, and this thicker lower part of the side wall preferably has a variable thickness which decreases continuously and uniformly from the base, where it is substantially equal to the thickness of the bottom, toward the top, where it becomes substantially equal to the nominal thickness of the side wall.

The invention will be more clearly understood on reading the detailed description which follows of certain embodiments given by way of nonlimiting examples.

BRIEF DESCRIPTION OF THE DRAWINGS

In this description, reference is made to the appended drawings in which:

FIGS. 5A to 5E represent diagrammatically the preform, the intermediate containers and the final container which are encountered during the execution of a preferred process for manufacturing a container according to the invention;

DESCRIPTION OF THE PREFERRED EMBODIMENTS

Figure 1:
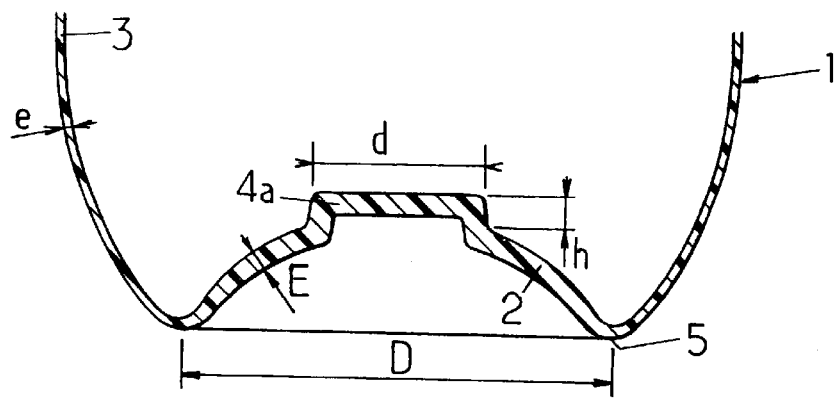
FIGS. 1 to 4 represent, in cross section, highly diagrammatically respectively four alternative embodiments of the lower part of a container obtained according to the invention.

Referring first of all to FIGS. 1 to 4, a container, such as a bottle, flask or the like, according to the invention consists of a biaxially oriented thermoplastic, generally, but not exclusively, polyethylene terephthalate (PET), polyethylene naphthalate (PEN) or PET-PEN copolyesters, alloys or blends, which container is produced so as to be able to withstand, without appreciable deformation, relatively harsh conditions of use, for example, either from a thermal standpoint (for example, filling of the container with a hot liquid, pasteurization of the content after filling, high-temperature washing) or from a chemical standpoint (for example, the aggressiveness of products with which it is brought into contact, in particular the case of reusable containers cleaned using a solution based on sodium hydroxide) or from a mechanical standpoint. More especially, as shown in FIGS. 1–4, what is of interest is a container 1 which has an inwardly convex curved bottom 2 (called "champagne bottom"), which bottom has a thickness substantially greater than that of the side wall 3 defining the body of the container (also called later on the intermediate part of the container).

The bottom 2 has a central area 4 which is devoid of outwardly facing convexity and which, by way of example, is substantially planar with the exception of the point of injection when it exists (and which is not shown in the drawings). This central area may have the approximate shape of a plateau 4a (FIG. 1) shifted axially inward or alternatively be curved and rounded in the form of an inwardly convex dome 4b (FIG. 2).

Figure 2:
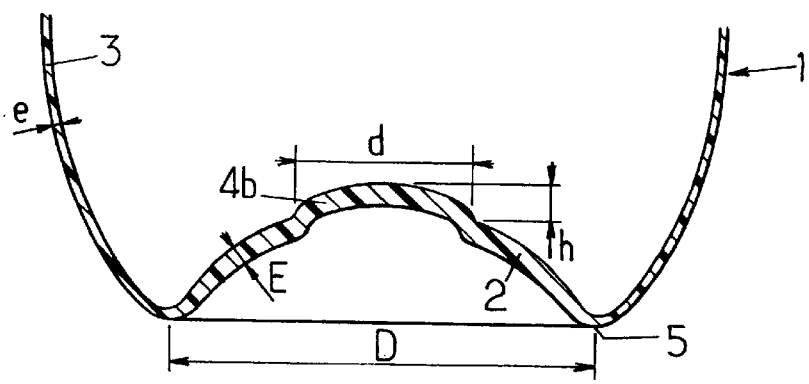

The central area 4 then projects from the surrounding region of the bottom by at least 1 mm toward the inside of the container (the projection is denoted by h in FIGS. 1 and 2). In a typical example, the projection is approximately 5 mm. The thickness of this central area 4 is substantially constant and substantially equal to that of the rest of the bottom. This thickness E is approximately three to eight times that of the thin side wall e of the container.

For the rest, the central area 4 may have any desired configuration; however, with regard to the execution of the manufacturing process referred to later, an approximately round contour would seem to correspond to the simplest manufacture. Its transverse dimension d (its diameter in the case of a. round shape) represents approximately 10 to 40%, preferably 35%, of the transverse dimension D of the bottom.

Figure 4:
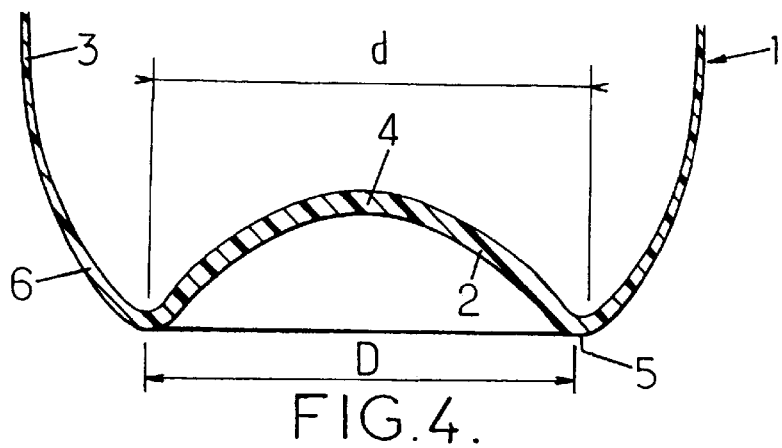

In an embodiment of simpler shape, the entire bottom exhibits a continuous curvature and constitutes a continuous vault incorporating the central area 4, without an angular line and without opposite curvature (with the exception of the aforementioned optional point of injection) as shown in FIG. 4.

Figure 3:
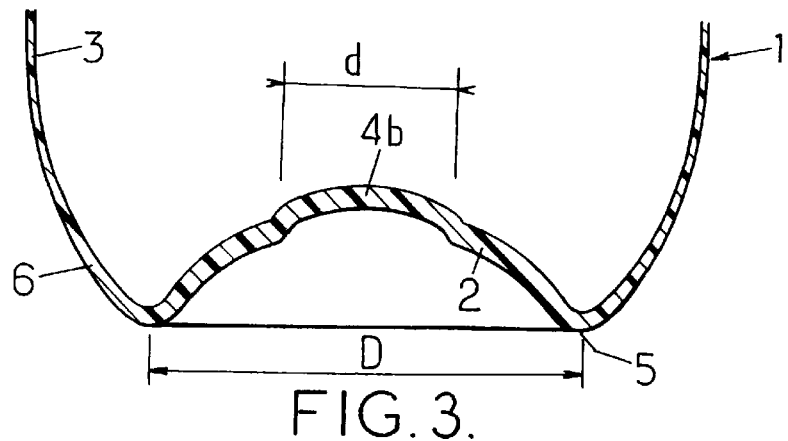

The structure of the champagne bottom which has just been described gives the bottom good stability, in particular in the central part of the latter, both under the harsh conditions of use which the container is likely to encounter, including when it is a reusable container, and over the course of time. In order to increase the stability of the bottom further, in particular in its peripheral region where it joins the side wall so as to obtain a bearing contour 5 which extends substantially in a plane and to achieve good stability of the container resting on a support, it is desirable for the lower part 6 of the side wall 3 adjacent to the bottom also to have a thickness greater than that of the rest of the side wall and which may, for example, decrease progressively from the base (where it is substantially equal to that of the bottom) toward the top where it resumes the nominal thickness value of the side wall; the height of this thicker part 6 does not exceed approximately twice the height of the champagne bottom equipped with its projecting central area 4. Such a configuration is shown in FIG. 3 in the example of an embodiment of a central area in the form of a dome 4b, as well as in the example in FIG. 4.

In order to manufacture a container as above, the following process may be employed.

First of all, at least the amorphous body 7 of a preform 9 (FIGS. 5A and 5B) is heated to a temperature at least equal to the softening temperature of the thermoplastic. The preform 9 may have, as shown in FIG. 5A, a thickness which is greater at least in its lower part 10 (which includes the bottom and a neighbouring area), intended to form, at the end of the manufacturing process, the thicker bottom of the container. As a variant, it is also possible to use, as shown in FIG. 5B, a preform having a constant wall thickness, including in its bottom region, the greater thickness of the container then being obtained by carrying out the heating step and the next step, of molding, in an appropriate fashion.

After this step of heating the body 7 of the preform, the hot body 7 of the preform, is molded, in particular by blow molding or by stretch-blow molding, in order to form the body 11 of an intermediate container 12 (FIG. 5C) which is oversized compared to the final container to be obtained.

In the intermediate container 12, the body 11 has a height approximately 15 to 30% greater than the height of the final container to be obtained and a transverse dimension of approximately 0 to 30% greater than the transverse dimension of the body of the final container, while the shaping walls of the mold are maintained at a temperature of between 10° C. and 180° C., preferably approximately 60° C.

During this first molding operation, the bottom is inwardly rounded in the manner of a champagne bottom and has a central area 14 devoid of any outwardly convex part, with the exception of the optional point of injection (i.e. in the form of a continuous vault or in the form of a dome, as shown in FIG. 5C, or in the form of a plateau); the bottom 13 together with the central area 14 has the shape of the bottom of the final container to be obtained and has a diameter equal to or slightly greater (for example by approximately 0 to 4%) than that of the bottom of the final container to be obtained, while the corresponding mold walls for shaping this bottom part are cooled to a temperature substantially less than that of the walls for shaping the abovementioned intermediate part of the body 11; here, this temperature is between approximately 2 and 20° C., preferably approximately 10° C. The overall degree of elongation of the thermoplastic in that region of the preform which is intended to form the entire bottom is less than or at most equal to 1.8 and corresponds to development of the material with limited drawing or with no appreciable drawing; in the intermediate part of the preform lying between the neck and the part intended to form the bottom of the container, the longitudinal draw ratio is higher and equal to or less than 3.2.

After this first molding, at least the body of the intermediate container is heated (optionally the neck 8 may also undergo a heat treatment during this step) by providing differentiated heating: the intermediate part of the body is heated to a temperature of between approximately 160 and 230° C., preferably for a period lasting between 30 and 130 seconds, while the bottom is heated to a temperature of approximately 60 to 120° C., preferably 75° C., preferably for a period lasting between 10 and 130 seconds but which may differ from that of the heating of the intermediate part.

A preform 15 with a necked and deformed body 16 is then obtained (see FIG. 5D), with a bottom 17 which also optionally has been able to undergo a slight reduction in section (for example by about 1% but not exceeding 4%) in such a way that the bottom 17 thereafter has approximately the shape and size [lacuna] of the final container to be obtained (the order of magnitude of possible variation in the diameter is 0 to 1% and that of the depth is 0 to 2%).

It will be noted that the preform 15 obtained during this step may have a length substantially greater than that of the final container to be obtained, as indicated in Document FR-93/15920.

After this, a second blow or extrusion-blow molding step relating to the intermediate part of the body of the preform 15, but with no appreciable drawing of the bottom 17, is carried out so as to form the final container 1 (FIG. 5E). During the molding, pressure compensation may be provided in the mold, under the bottom 17 of the preform 15, in order to compensate for the blowing pressure, so as to prevent the material of which the bottom is composed from being subjected to too great a force and from undergoing drawing. This pressure compensation may in particular be obtained, as taught by Document FR 93/15920, by providing a mold equipped with a bottom arranged so as to exert substantially no axial force on the bottom of the preform 15, while being immediately and closely adjacent to said bottom when the blowing pressure is applied in the preform. A movable bottom, as taught in the aforementioned document, may thus be used.

During the molding step, the temperature of the shaping walls of the mold is between 110 and 160° C., preferably approximately 140° C., for the intermediate part 16 of the body and between 20 and 130° C., preferably between 90 and 120° C., for the bottom 17.

Although the process which has just been described with reference to FIGS. 5A–5E would seem to be preferred for the advantageous characteristics of the containers which it allows to be obtained, it is possible, however, to obtain containers provided with a champagne bottom as indicated above by making use of a conventional blow-molding or stretch-blow-molding manufacturing process in a single step.

Figure 6A:
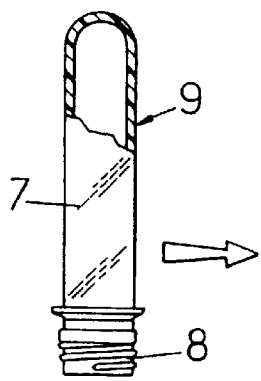
FIGS. 6A to 6C represent diagrammatically the preform and the final container in the execution of another process for manufacturing a container according to the invention.
Figure 6B:
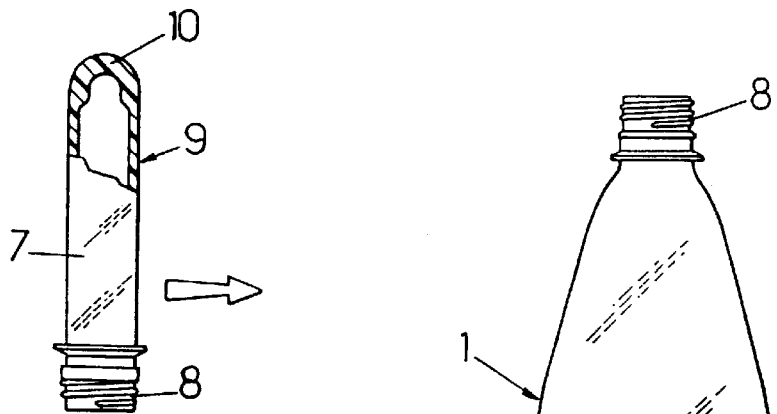

At least the amorphous body 7 of a preform 9 is then heated to a temperature at least equal to the softening temperature of the thermoplastic, this preform 9 possibly having, as in the previous process, a greater thickness in its lower part 10 (FIG. 6A) or a substantially uniform thickness (FIG. 6B).

Figure 6C:
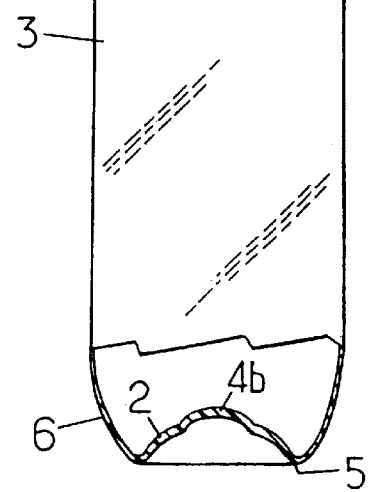

After this step of heating the body 7 of the preform, the hot body 7 of the preform is molded, by blow molding or, better, by stretch-blow molding, in order to form the final container 1 (FIG. 6C) with the bottom formed as indicated above.

In a manner known per se, a hot-wall mold or a cold-wall mold may be employed. In all cases, the operating conditions (in particular, the preform temperature, the blowing pressure and the mold wall temperature) for such a process are known to those skilled in the art.

What is claimed is:

1. A method of manufacturing a container from a preform made of a thermoplastic which exhibits a biaxial orientation, said container being capable of withstanding relatively harsh conditions of use without appreciable deformation, said container comprising a neck, a body, and a bottom, said body comprising a wall connecting said neck and said bottom, said bottom being of an inwardly convex curved shape which has a thickness substantially greater than that of said wall of said container, said method comprising the steps of:

heating an amorphous body of said preform to a temperature at least equal to a softening temperature of said thermoplastic;

molding said heated body of said preform in a mold having shaping walls, to form a body of an intermediate container, said intermediate container having a height which is between 15 and 30 percent greater than a height of said container in final form, and having a transverse dimension which is approximately between 0 to 30 percent greater than a transverse dimension of said body of said container in final form, while corresponding shaping walls of said mold are maintained at a temperature of between 10 and 180 degrees Centigrade;

cooling said corresponding shaping walls of said mold to a temperature which is substantially less than said temperature for shaping an intermediate portion of said body of said intermediate container, and which is between approximately 2 and 20 degrees Centigrade, wherein said bottom of said intermediate container is inwardly rounded and has a central area devoid of outwardly facing convexity, said bottom of said intermediate container having substantially a shape of said bottom of said container in final form, and said bottom having a diameter which is equal to or greater than that of said bottom of said container in final form, and wherein a degree of elongation of said thermoplastic in a region of said preform intended to form said central area is less than or equal to 1.8 and corresponds to a development of said thermoplastic without substantial drawing thereof;

heating at least said body of said intermediate container, a side wall of said body of said intermediate container being heated to a first temperature of between approximately 160 and 230 degrees Centigrade, and said bottom of said intermediate container being heated to a second temperature of between approximately 60 and 120 degrees Centigrade, to obtain a preform of said container which has a necked and deformed body and a neck and has a bottom in final form which has approximately a desired shape and size of the final container; and molding said body of said necked and deformed preform by blowing a side wall of said container without appreciable drawing of said bottom.

2. The method according to claim 1, wherein said necked preform is substantially longer than said container obtained in final form.

3. The method according to claim 1, wherein the diameter of said bottom of said intermediate container is between 0 and 15% greater than said diameter of said container obtained in final form.

4. The method according to claim 1, wherein said side wall of said body of said intermediate container is heated for a period lasting between approximately 30 and 130 seconds.

5. The method according to claim 1, wherein said bottom of said intermediate container is heated for a period lasting between approximately 10 and 130 seconds.

6. The method according to claim 1, wherein a temperature of said mold during molding of said body of said necked preform is between approximately 110 and 160° C., for an intermediate portion of said body of said necked preform and between approximately 20 and 130° C., for said bottom of said necked preform.

7. The method according to claim 1, wherein pressure compensation under said bottom of said necked preform is ensured by providing, in said mold, a mold bottom arranged so as to exert substantially no axial force against said bottom of said necked preform while being immediately and closely disposed adjacent to said bottom of said necked preform when blowing pressure is applied to said necked preform.

8. The method according to claim 7, wherein said mold bottom mold is a moveable bottom.

9. The method according to claim 1, wherein said central area has approximately a shape of a plateau shifted axially inward.

10. The method according to claim 1, wherein said central area is rounded in a form of an inwardly convex dome.

11. The method according to claim 1, wherein said central area projects from a surrounding region of said bottom of said container by at least 1 mm.

12. The method according to claim 1, wherein said central area has a thickness substantially equal to that of a rest of said bottom of said container.

13. The method according to claim 1, wherein said transverse dimension of said central area represents approximately 10 to 40%, preferably approximately 35%, of said transverse dimension of said bottom of said intermediate container.

14. The method according to claim 1, wherein an entire bottom of said container exhibits a continuous curvature.

15. The method according to claim 1, wherein a lower portion of a side wall adjacent to said bottom of said container also has a greater thickness than that of a rest of said side wall, a height of said thicker lower portion not exceeding twice a height of said bottom of said container.

16. The method according to claim 15, wherein said increased thickness of said lower portion of said side wall decreases continuously and uniformly from a base of said container, where said thickness is substantially equal to that of said bottom of said container, toward a top of said container, where said thickness becomes substantially equal to a nominal thickness of said side wall.

17. The method according to 1, wherein said thickness of said bottom of said container is equal to approximately three to eight times a thickness of a side wall of said body of said container.

18. The method according to claim 1, wherein said preform used during said step of heating said amorphous body of said preform, has a greater thickness at least in a lower portion of said preform, which is intended to form, after said molding step of said preform, a thicker bottom of said intermediate container.

19. The method according to claim 1, wherein said preform used during said step of heating said amorphous body of said preform, has a substantially uniform thickness, and that a greater thickness of said bottom of said intermediate container is obtained during said step of molding said heated body of said preform.

* * * * *